US 8,041,036 B1

(12) United States Patent
Gerber et al.

(10) Patent No.: US 8,041,036 B1
(45) Date of Patent: Oct. 18, 2011

(54) METHOD AND APPARATUS FOR PREVENTING THE INTERCEPTION OF DATA BEING TRANSMITTED TO A WEB SITE BY A MONITORING PROGRAM

(75) Inventors: Mark A. Gerber, Coppell, TX (US);
Kevin M. Krone, Coppell, TX (US);
Bradley D. Newcomb, Plano, TX (US);
Robert S. Shaffer, Plano, TX (US);
Chris Stromberger, Irving, TX (US);
Steven F. Taylor, Dallas, TX (US)

(73) Assignee: Southwest Airlines Co., Dallas, TX (US)

( * ) Notice: Subject to any disclaimer, the term of this patent is extended or adjusted under 35 U.S.C. 154(b) by 188 days.

(21) Appl. No.: 12/118,630

(22) Filed: May 9, 2008

Related U.S. Application Data

(60) Division of application No. 10/694,102, filed on Oct. 27, 2003, now Pat. No. 7,394,900, which is a continuation of application No. 10/179,617, filed on Jun. 24, 2002, now abandoned.

(51) Int. Cl.
*H04L 9/00* (2006.01)
*G06F 7/04* (2006.01)
(52) U.S. Cl. .......................................... 380/259; 726/26
(58) Field of Classification Search ................ 705/5
See application file for complete search history.

(56) References Cited

U.S. PATENT DOCUMENTS

| 6,442,276 B1 | 8/2002 | Doljack |
| 6,801,226 B1 | 10/2004 | Daughtrey |
| 2001/0054155 A1* | 12/2001 | Hagan et al. ................. 713/193 |
| 2004/0153348 A1* | 8/2004 | Garback ............................ 705/5 |

OTHER PUBLICATIONS

Wood, Lauren, et al.; "Document Object Model (DOM) Level 1 Specification," (Second Edition) Version 1.
Le Hors, Arnaud, et al.; "Document Object Model (DOM) Level 2 Core Specification," Version 1.0.
Le Hors, Arnaud, et al.; "Document Object Model (DOM) Level 3 Core Specification," Version 1.0.

* cited by examiner

*Primary Examiner* — Nasser Moazzami
*Assistant Examiner* — Daniel L Hoang
(74) *Attorney, Agent, or Firm* — Fish & Richardson P.C.

(57) ABSTRACT

A method and apparatus for preventing the use of data involves creating a first association between a set of labels and a first set of codes, where the set of labels contains information to be displayed on a computer, while each code in the first set of codes is associated with a particular label. An encryption key is linked with the first association. The set of labels, the first set of codes, and the first encryption key are sent to the computer. Later, when codes from the first set of codes and the first encryption key are received back from the computer, the codes returned from the computer are then matched to labels from the set of labels using the first encryption key. Subsequent, different associations between the set of labels and other sets of codes are created, and additional encryption keys are also created to identify the subsequent associations.

20 Claims, 6 Drawing Sheets

*FIG. 3*

```
table border="0" cellspacing="1" cellpadding="2">
    <tr>
        <td bgcolor="#FFFFFF" colspan="3"><font face="Arial" size="3"><b>Where are you traveling?</b></font>
        <font face="Arial" size="1">(See a<a href="/about_swa/routemap.html">map</a> of cities Southwest Airlines serves.)</font></td>
    </tr>
    <tr>
        <td bgcolor="#FFAA00" align="center">
            <font face="Arial" size="3" color="#000000"><b>Depart</b></font></td>
        <td bgcolor="#FFAA00" align="center">
            <font face="Arial" size="3" color="#000000"><b>Arrive</b></font></td>
        <td bgcolor="#FFAA00" align="center">
            <font face="Arial" size="3" color="#000000"><b>Return</b></font></td>
    </tr>
    <tr>
        <td bgcolor="#F0F0F0">
            <select name="albert" size="5">
<option value="Albany - ALB">Albany, NY - ALB</option>
<option value="Albuquerque - ABQ">Albuquerque, NM - ABQ</option>
<option value="Amarillo - AMA">Amarillo, TX - AMA</option>
<option value="Austin - AUS">Austin, TX - AUS</option>
<option value="Baltimore - BWI">Baltimore, MD - BWI</option>
<option value="Birmingham - BHM">Birmingham, AL - BHM</option>
<option value="Boise - BOI">Boise, ID - BOI</option>
<option value="Buffalo - BUF">Buffalo, NY - BUF</option>
<option value="Burbank - BUR">Burbank, CA - BUR</option>
<option value="Chicago Midway - MDW">Chicago Midway, IL - MDW</option>
<option value="Cleveland - CLE">Cleveland, OH - CLE</option>
<option value="Columbus - CMH">Columbus, OH - CMH</option>
<option value="Corpus Christi - CRP">Corpus Christi, TX - CRP</option>
<option value="Dallas Love - DAL">Dallas Love, TX - DAL</option>
....
<option value="Spokane - GEG">Spokane, WA - GEG</option>
<option value="St. Louis - STL">St. Louis, MO - STL</option>
<option value="Tampa - TPA">Tampa, FL - TPA</option>
<option value="Tucson - TUS">Tucson, AZ - TUS</option>
<option value="Tulsa - TUL">Tulsa, OK - TUL</option>
<option value="West Palm Beach - PBI">West Palm Beach, FL - PBI</option>

</select></td>
```

*FIG. 4*

./cgi-bin/showItinerary?albert=Dallas Love - DAL&arrival_airport=Houston Hobby - HOU&return_airport=Dallas Love - DAL&outbound_date=April20&outbound_tod=0&return_date=April24&return_tod=0

*FIG. 8*

Departing Flight — Dallas Love to Houston Hobby (Sunday, April 21 2002)

Before Noon ▼  Sunday, Apr 21 ▼

| Flights | Departs | Arrives | Stops | Refundable Anytime $91 | Restricted Fares $69–$84 | Advance Purchase $64 | Discount Fares $53 | Promotional Fares $ |
|---|---|---|---|---|---|---|---|---|
| 1 | 7:00am | 7:55am | N/S | o | o | o | o | o |
| 5 | 8:00am | 8:55am | N/S | o | o | o | o | o |
| 11 | 9:30am | 10:25am | N/S | o | o | o | o | o |
| 21 | 11:30am | 12:25pm | N/S | o | o | o | o | o |

Returning Flight — Houston Hobby To Dallas Love (Wednesday, April 24 2002)

Before Noon ▼  Wednesday, Apr 24 ▼

| Flights | Departs | Arrives | Stops | Refundable Anytime $91 | Restricted Fares $69–$84 | Advance Purchase $64 | Discount Fares $53 | Promotional Fares $ |
|---|---|---|---|---|---|---|---|---|
| 1636 | 6:15am | 7:10am | N/S | o | o | o | o | o |
| 2 | 6:30am | 7:25am | N/S | o | o | o | o | o |
| 4 | 7:00am | 7:55am | N/S | o | o | o | o | o |

Price Trip>>

FIG. 5

```
<input type="hidden" name="ENCRYPT_KEY" value="LOEKDHMEIHLHHHDJLNNE">
...

<td bgcolor="#F0F0F0">
<select name="DKIGGEZDFDIIHZZDFDUIZZZEFFUGHEZDFI"size="5">
<option value="DKVIUZXEGGKKZDZDKKLVKYVGEE">Albany, NY - ALB</option>
<option value="DKZIUZXEGFLFGZYDGFUFGZYDGKLJJGVIEEUKJZWKII">Albuquerque, NM - ABQ</option>
<option value="DKLJVZXEGFIVUKZEGGVKVYVIKEUKKGXGII">Amarillo, TX - AMA</option>
<option value="DKYHGZXDFFKKLKZEKKMFKYVGDD">Austin, TX - AUS</option>
<option value="DKYVKWXEGFLLVKZEGFUUJVZIKKUYEWXFEI">Baltimore, MD - BWI</option>
<option value="DKKIZWXEFGFDLKZEGGKKVZZEKKKZHYVGEE">Birmingham, AL - BHM</option>
<option value="DKMYMWXEGFUUJVZIKKUYMWXGEI">Boise, ID - BOI</option>
<option value="DKWEGWXDGGULUZZEGKZIJGVIEDUKJLXKII">Buffalo, NY - BUF</option>
<option value="DKLIGWXDFGUWLZZEGKZIJGVIEDUKJWWKII">Burbank, CA - BUR</option>
<option value="DKMYYXXEGGULEZZEGKXGZGXEGFKKZZZDKKXGVYVGED">Chicago Midway, IL - MDW</option>
<option value="DKWFUXXEGFHJUVZEGGUUJUZIKKUFUXXGEI">Cleveland, OH - CLE</option>
<option value="DKZVMXXEGFMFHGZEFFMKVYVIKEUKYGXGII">Columbus, OH - CMH</option>
<option value="DKUIMXXEFFMKIVYDKEMYHJZDGFKKZUYEKKUIIYVGDD">Corpus Christi, TX - CRP</option>
<option value="DKJVKUXEGGJKIZZDKEUFDEZDGKVGJGVIEEUKJFXKII">Dallas Love, TX - DAL</option>
...

<option value="DKELJXWDGGUFLZZEGKZDJGVIEEUKJMXKII">Spokane, WA - GEG</option>
<option value="DKUMFXWDKKGFMFXEFGUUJXYIKKUVFXWFEI">St. Louis, MO - STL</option>
<option value="DKUUKUWEGFUUJZZIKKUJJUWFEI">Tampa, FL - TPA</option>
<option value="DKMHGUWDGFKKLEZEKKMFFYVFDD">Tucson, AZ - TUS</option>
<option value="DKMVGUWDGFUUJZZIKKUVGUWFEI">Tulsa, OK - TUL</option>
<option value="DKYHGMWEFFJJJYVFGGZIJGZIEGUZIZZEGKLKJGVIDEUKJKXKII">West Palm Beach, FL - PBI</option>
</select></td>
```

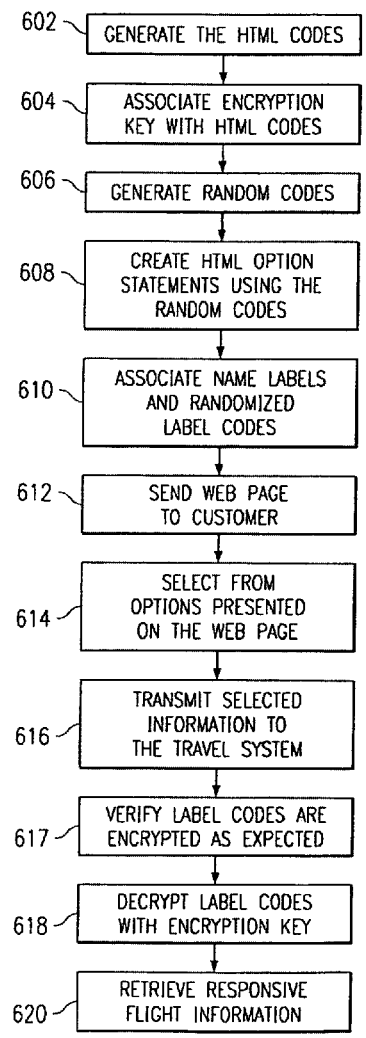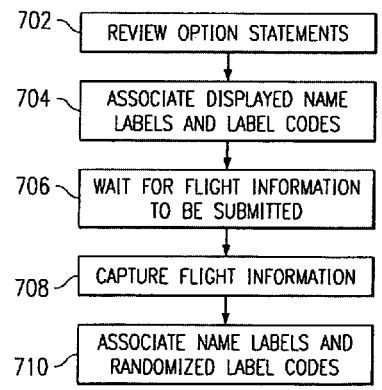

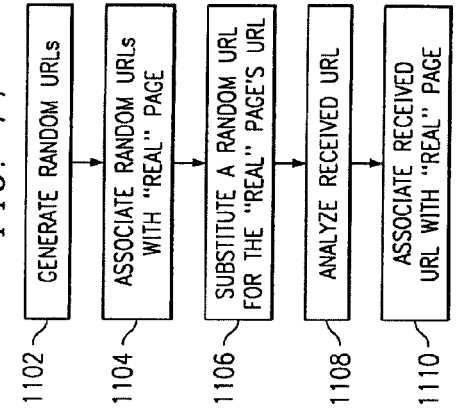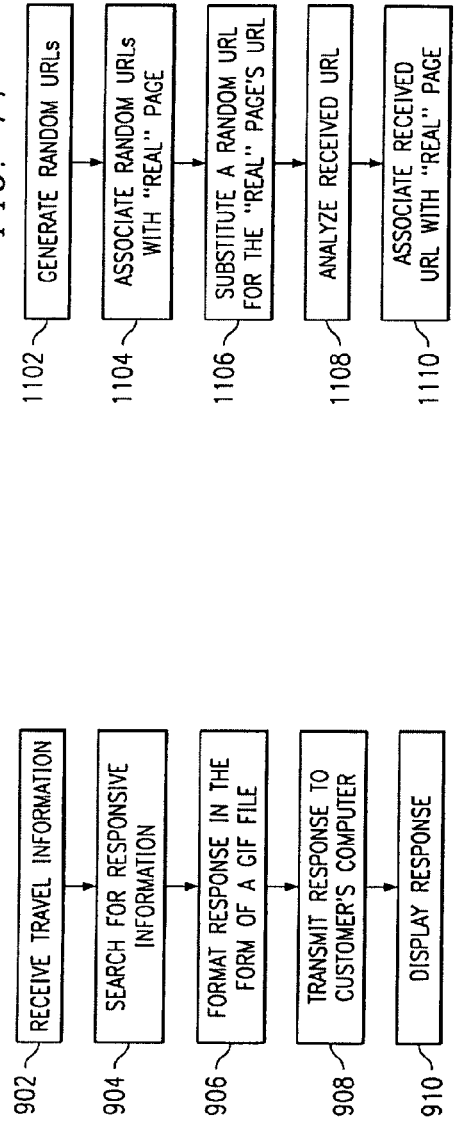

METHOD AND APPARATUS FOR PREVENTING THE INTERCEPTION OF DATA BEING TRANSMITTED TO A WEB SITE BY A MONITORING PROGRAM

RELATED APPLICATION

This Application is a divisional of, claims priority from, and incorporates by reference the disclosure of U.S. application Ser. No. 10/694,102 filed Oct. 27, 2003, which is a continuation of U.S. application Ser. No. 10/179,617 filed Jun. 24, 2002.

BACKGROUND OF THE INVENTION

1. Technical Field

The present invention relates generally to a method for preventing the interception of data as it is sent from a computer system to a web site. More specifically, the present invention presents a technique for preventing the interception of data by a monitoring program as it is sent from a web browser to a web site, and a method for overcoming the same.

2. Description of the Related Art

Today, web sites on the Internet allow visitors to purchase a variety of goods and services. Often, the process of purchasing these goods and services consists of a customer using a web browser to select a specific product and any options available with the product from a merchant's web site. Once the product is selected, the customer enters a credit card number to pay for the product, and the product is subsequently shipped to the customer or the service provided.

Lately, a number of companies have begun offering automated comparison-shopping computer programs that can "supplement" a customer's shopping experience on the Internet. Comparison-shopping programs, such as CometCursor and SideStep, can monitor which goods or services a customer selects from a merchant's web site. Once the customer finally selects a good or service, these comparison-shopping programs first determine the identity of the good or service selected by the customer, then the programs automatically contact other web sites which sell comparable goods or services in an effort to find a better bargain for the customer. These programs ultimately collect data from the other merchants and report their findings to the customer. The customer is then free to continue his purchase of the good or service from the original merchant or to purchase comparable goods or services from one of the other web sites discovered by the comparison-shopping program.

For example, a customer in need of an airline ticket may navigate to QuickFlight Airlines, Inc.'s web site (www.quickflight.com) to purchase a ticket for use on QuickFlight. Once the customer navigates to QuickFlight's web site, the customer specifies the location, date, and time of the departure flight, as well as the destination location using a web browser. For a round trip, the customer specifies the same information for a return flight. After the customer specifies this information, the customer directs the browser to submit the information to the QuickFlight web site so that flights meeting the customer's specifications can be returned to the customer for review. At this point in the process, a program previously installed on the customer's computer named Flight Data Snooper intercepts the HTML-formatted data being transmitted to the QuickFlight web site by the customer. Flight Data Snooper has been programmed to extract the flight information previously entered by the customer from the data, namely, the departure and destination cities, as well as the corresponding dates and times. Once this data is extracted, Flight Data Snooper proceeds to query other airline and travel web sites to get availability and price information for similar flights. When this information is returned, Flight Data Snooper reformats and presents the information to the customer along with the information returned to the customer by QuickFlight's web site.

Alternatively, when a customer is visiting another travel web site, Flight Data Snooper may attempt to programmatically retrieve flight options and fares from QuickFlight's web site that correspond to flight information entered by the customer at the other travel web site. Flight Data Snooper then takes these flight options and fares, along with any others it was able to collect from other travel-related web sites, and presents them to the customer.

While Flight Data Snooper may provide a service to the customer by allowing a wide search to be conducted automatically, its operation can interfere with the customer's use of the QuickFlight web site. For instance, the traffic generated by Flight Data Snooper can slow the response time of the QuickFlight site, thereby giving the customer the false impression that the QuickFlight web site is slow to respond to the customer's request. In addition, if Flight Data Snooper attempts to automatically retrieve price quotes and availability information from the QuickFlight web site, there is always the risk that Flight Data Snooper could misinterpret the information supplied to it by QuickFlight and pass along inaccurate information to the customer in the name of QuickFlight. In addition, Flight Data Snooper's mechanical, autonomous operation may generate excessive queries to QuickFlight's site, thereby slowing the QuickFlight's site as a whole.

Thus, the need exists to prevent programs like Flight Data Snooper from surreptitiously gathering information and using it to obtain other offers for what it believes are comparable goods and services.

SUMMARY OF THE INVENTION

One aspect of the present invention relates to a method and apparatus for preventing the use of data transmitted by a computer to a web site by a program operating on the computer. Initially, a first association between a set of labels and a first set of codes is created. The set of labels contains information to be displayed on the computer, while each code in the first set of codes is associated with a particular label. An encryption key is then linked with the first association. The set of labels, the first set of codes, and the first encryption key is then sent to the computer. Some time later, codes from the first set of codes and the first encryption key are received back from the computer. The codes returned from the computer are then matched to labels from the set of labels using the first encryption key. Afterwards, subsequent associations between the set of labels and other sets of codes are created. These associations are different than the association between the set of labels and the first set of codes. Additional encryption keys are also created to identify the subsequent associations.

Another aspect of the present invention relates to a method and a computer program product for determining the meaning of a code that describes a user's selection of an item on a web page. In this mode of operation, the information that defines the web page is first analyzed. Then, an association between the codes and labels presented on the web page is created. Afterwards, the code describing an item selected by a user is captured. Finally, the label associated with the code is identified by referencing the association between the codes and labels.

Yet another aspect of the present invention relates to a method for replacing static URLs for reservation pages with dynamic ones that change over time. Initially, the travel system generates a set of random URLs. These "alias names" are substitutes for the URL that would normally be associated with the web page that begins the reservation process. Next, the travel system internally associates these alias names with the URL of the real page that begins the reservation process. The alias names are then periodically substituted in place of the reservation page URL, thereby frustrating data snoopers' efforts to key on a particular URL.

BRIEF DESCRIPTION OF THE DRAWINGS

The novel features believed to be characteristic of the present invention are set forth in the appended claims. The invention itself, however, as well as a preferred mode of use, will best be understood by reference to the following detailed description of an illustrative embodiment when read in conjunction with the accompanying drawings, wherein:

FIG. 3 shows the HTML codes that are transmitted from the travel system to the browser operating on the customer's computer to draw the portion of a screen shown in FIG. 2;

FIG. 4 illustrates a hypothetical set of data that can be sent back to the travel system upon selection of certain options from the screen shown in FIG. 3;

FIG. 5 is HTML code that has been scrambled according to the present invention;

FIG. 6 is a flowchart illustrating how the present invention scrambles label codes associated with displayed name labels;

FIG. 7 is a flowchart describing how a flight data snooper can overcome the technique described in FIG. 6;

FIG. 8 is a screen showing responsive flight information;

FIG. 9 is a flowchart that describes how a travel system uses a gif file to present responsive flight information;

FIG. 10 shows some of the HTML code necessary to generate the screen shown in FIG. 8 using gif files; and FIG. 11 is a flowchart that describes how a travel system can prevent the interception of URL requests.

DETAILED DESCRIPTION OF THE INVENTION

Figure 1:
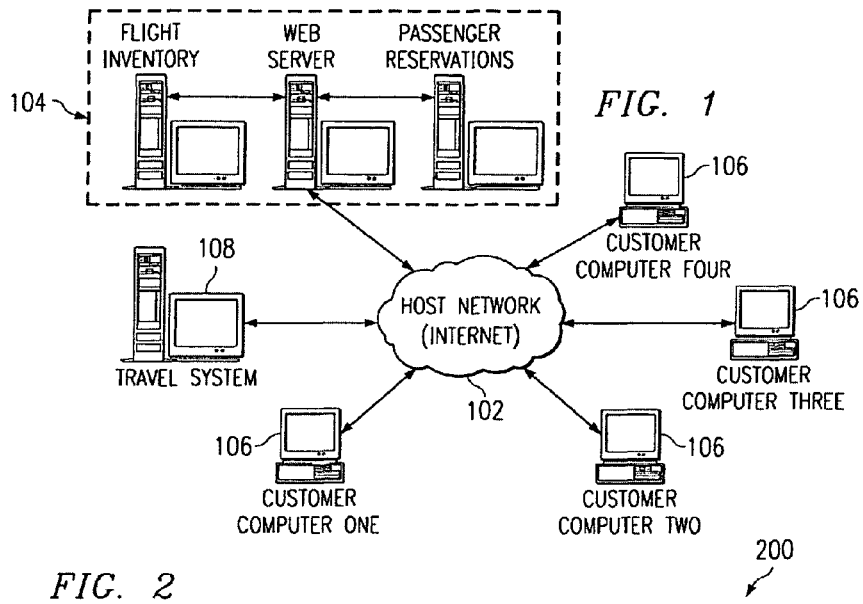
FIG. 1 illustrates a connected network and a series of computers upon which the present invention can be implemented.

FIG. 1 depicts a computer system upon which the present invention can be implemented. As illustrated in FIG. 1, host network 102 is a connected network of computers, an example of which is the Internet. Host network 102 can also be implemented by using a private access wide area network (WAN) or any other network. The size of the network is not material to the operation of the present invention.

Attached to host network 102 is travel system 104 and customer computers 106. Travel system 104 is a network of computers that store, access, and process information relating to air travel services. The network of computers that comprises travel system 104 usually contains interconnected computers that perform specialized functions. For instance, some computers in the network may be dedicated web servers whose primary function is to transmit HTML pages (screens) to customers' computers and receive the information entered by customers using a web browser operating on their computers. Other computer systems in travel system 104 are responsible for maintaining databases of flight inventories and customer reservations. Thus, the computers that function collectively as travel system 104 serve as a web site and a repository of information related to various travel options available to a customer, as well as customer reservations and/or purchases of these travel services. Travel system 104 can be implemented in an almost infinite number of ways, and the specific embodiment show in FIG. 1 will undoubtedly change as technology advances.

Travel system 108 represents another web site and set of computers that function in a similar manner to travel system 104. Examples of travel systems available today include the web sites (and associated computer systems) maintained by Southwest Airlines (www.southwest.com), American Airlines (www.aa.com), Travelocity (www.travelocity.com), and Delta Airlines (www.delta.com).

Customer computers 106 can be implemented using any general-purpose computer configured to transmit and receive information via host network 102. Customer computers 106 can be implemented using personal computers or workstations such as those sold by Dell, Compaq, Hewlett-Packard, Sun, Apple and others. These computers often operate under the control of an operating system having a graphical-user interface, and execute a software program, commonly known as a "browser", that enables customers to request, receive, display and manipulate data from the connected network, examples of which are Microsoft's Internet Explorer and Netscape's Navigator. Customer computers 106 allow customers to receive and view screens transmitted to customers from travel system 104, and allow customers to transmit information back to travel system 104 via host network 102.

Although the description of FIG. 1 presented above contemplates that customer computers 106 will be implemented using traditional personal computers, a variety of other communication devices can be used instead of traditional personal computers. For example, personal digital assistants (PDAs) and cellular phones are now capable of transmitting data to and receiving data from a connected network. Since these devices can transmit data to and receive data from a connected network, they can perform all of the tasks required by customer computers as these computers are used in the present invention. Thus, any device that can transmit data to/receive data from a connected network is, for purposes of the specification and claims, to be considered a computer.

In addition to a browser, each customer computer 106 executes a data snooper program (referred to herein as a "data snooper"). Current examples of data snoopers are the programs SideStep by SideStep, Inc. (www.sidestep.com) and CometCursor by Comet Systems (www.cometcursor.com). In the case of SideStep, this data snooper monitors the particular web page being viewed by a customer. When the customer visits certain travel-related web sites and transmits information concerning destination and arrival cities, along with corresponding dates and times (in the case of airline information, such data is referred to herein as "flight information"), SideStep captures this information (as is described below). SideStep then uses the flight information to conduct a search of other web sites in an effort to present the customer with alternative flight options that correspond to the flight information entered by the customer.

Figure 2:
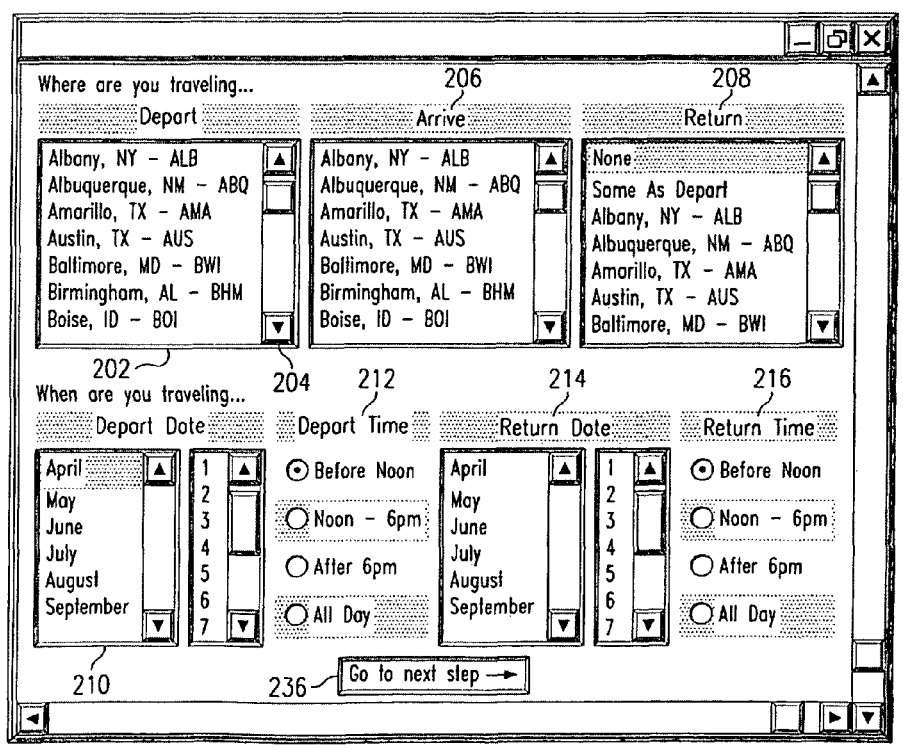
FIG. 2 is a portion of a screen image that is displayed on a customer's computer that allows the customer to initiate the process of purchasing an airline ticket.

FIG. 2 is a portion of a screen that can be displayed on a customer's computer when the customer, using a browser, navigates to an airline web site to purchase an airline ticket. The information used to compose this screen is transmitted to the customer's computer by a travel system. The portions of the screen not shown in FIG. 2 vary from one web site to another, but may include marketing information about the airline company presenting the web site and offers for other services. The information not shown in FIG. 2 is not material to the operation of the present invention.

Further, although FIG. 2 is directed to a travel system that sells airline tickets, the present inventions can be used with any web site that sells goods or services that are not unique. For example, data snoopers can be used in association with web sites that sell books, music, videos, computer equipment, hotel reservations, and rental car reservations. The businesses that operate these web sites face the same problems as described above, namely, data snoopers can capture information identifying a good or service of interest as it is sent to the business's web site and then search the web for comparable goods or service using the captured information. Also, these businesses' web sites are vulnerable to being programmatically searched by data snoopers trying to find comparable goods or services for a customer at another web site. Thus, although the particular embodiment of the present invention described herein is in association with a travel system that sells airline tickets, the present invention can be applied to a variety of other web sites.

As shown in FIG. 2, box 202 presents a customer with a list of cities from which a customer's flight can depart. Using a mouse, the customer can select a departure city by clicking the mouse button while the cursor on the customer's computer display device is pointed to/positioned on the desired departure city. The customer can use scroll bar 204 to display additional departure cities. (Wherever scroll bars appear in screen 200 or the subsequent screens discussed below, it should be assumed that additional data items, such as departure cities, exist, but are not displayed. A customer can use these scroll bars to display and select the additional items.) The particular city selected by the customer is highlighted after it is selected. Box 206 presents a customer with a list of cities to which the customer can travel. Box 208 presents a customer with a list of cities to which the customer's flight can return. For a typical round-trip flight, the city selected from box 208 will be the same as the city selected in box 202. Alternatively, the "Same As Depart" label can be selected from box 208. However, in some instances, a customer may wish to travel to a city other than the initial departure city, or not to schedule a return flight to the initial departure city. Other travel systems may not present boxes 202, 206, or 208, but instead require the customer to enter the three-letter airport code for the departure and destination airports, or include a text entry box where the customer can insert the desired city/airport names.

Boxes 210-216 allow the customer to specify the general time and dates of travel by allowing the customer to select general date and time of the departing flight (boxes 210 and 212, respectively) and the general date and time of the return flight (boxes 214 and 216, respectively).

FIG. 3 shows the HTML codes that are transmitted from the travel system to the browser operating on the customer's computer to draw box 202. Similar codes are sent to the customer's computer to draw boxes 204, 208, 210, and 214. As seen in FIG. 3, the information ultimately shown in box 202 is contained in a series of "option" statements having the format:

<option value="[Label Coder]">[Displayed Name Label]
</option>

The Displayed Name Label portion of the option statement describes what is actually displayed on the customer's computer. As can been seen in FIG. 2, the information shown in the various boxes is identical to the Displayed Name Labels contained in the corresponding option statements shown in FIG. 3. If a customer scrolls down in box 202, all of the Displayed Name Labels shown in FIG. 3 can be viewed. The contents of boxes 204-214 are also contained in similar option statements.

When a customer selects particular flight information from the boxes shown in FIG. 2 and activates button 236, the data shown in FIG. 4 is sent to the travel system so flights that correspond to the customer's selections can be presented. (FIG. 4 assumes that a customer selected Dallas, Tex. as the departure and return city, and Houston, Tex. as the arrival city. FIG. 4 further assumes that the customer specified the date and time of departure as April 20, before noon, and the date and time of return as April 24, before noon.) As can been seen in FIG. 4, several Label Codes are being sent to the travel system. These Label Codes correspond and describe the Displayed Name Labels selected by the customer in FIG. 2. For example, the Label Code "Dallas Love-DAL" shown in FIG. 4 is associated with the Displayed Name Label "Dallas Love, TX-DAL" selected by the customer. Again, this association is defined by the option statements used to present FIG. 2.

When the data shown in FIG. 4 is sent to the travel system, the data snooper also captures this data for its own use. There are several ways known in the art in which this data can be captured. Once the data snooper captures this data, it processes the data to extract the flight information. With this information, the data snooper proceeds to initiate its own search for comparable flights from other service providers.

In addition, the data snooper can use flight information from a customer browsing another web site to automatically retrieve price quotations from the travel system shown in FIG. 2. In this mode of operation, the data snooper captures the flight information a customer submits to another web site. The exact manner in which the customer specifies and transmits the flight information can vary from the method described above in relation to FIGS. 2-4, but generally consists of specifying the departure and destination locations, dates, and times, and then submitting the data to the particular merchant's web site. Once such data is captured by the data snooper, the data snooper is free to attempt to obtain price quotations for comparable flights from other web sites, including the particular web site described above in FIGS. 2-4.

When the flight data snooper attempts to retrieve flight information from the particular web site using data previously submitted to another web site, it first creates a query that the particular web site will understand. For the particular web site, this query will be in the form shown in FIG. 4, except that the specific departure and destination information will vary according to the flight information captured by the data snooper. After forming a query, the data snooper submits it to the particular web site for processing. In the absence of the present invention, the particular web site simply replies with various flight options and prices, in the exact way it would if a customer had actually entered the flight information in the particular web site itself. The flight data snooper then saves the flight options and prices returned by the web site for presentation to the customer currently engaged at the other merchant's web site.

The present invention prevents data snoopers from using the Label Codes sent back to the travel system from the customer's computer by continually varying the codes each time they are sent to a different customer's computer. As shown in FIG. 3, the Label Codes are simply shortened variations of the Displayed Name Labels. Further, these Codes do not change from customer to customer. Thus, it is a relatively simple matter for data snoopers to associate a given Label Code with a particular Displayed Name Label for a given web site. Further, even if the Codes are some arbitrary value, not related to the Displayed Name Labels, it is still relatively easy for data snoopers to associate a Code with a Name Label.

FIG. 5 shows HTML code that has been scrambled according to the present invention. This code is similar to the code shown in FIG. 3, except that the Label Codes do not have any logical correspondence to the Displayed Name Labels with which they are associated. Further, the travel system varies the Label Codes from one web page to another. Continually varying the Label Codes prevents data snoopers from memorizing the association between the Displayed Name Labels and the Label Codes.

FIG. 6 is a flowchart that describes this mode of operation. In response to a request by a customer, the travel system prepares to send to a customer's computer the HTML codes that will present a web page from which the customer can begin the process of purchasing an airline ticket by specifying flight information. Initially, the travel system generates the HTML codes necessary to create the desired page (602). In addition, an encryption key identification code is inserted into the page (604). The encryption key ID allows the travel system to identify how a particular page was encrypted. The encryption key ID is formed by combining a time stamp with a random number. The particular method used to generate the encryption key ID is not material to the present invention. This encryption key ID is also included in the data submitted to the travel system from the customer's computer. In this manner, the travel system can associate information it receives with a particular customer and can present pages that are responsive to a customer's previous data input.

In addition to the encryption key ID, the travel system generates a series of encrypted Label Codes for use with the various option statements that display flight options from which the customer can select (606). The encrypted Label Codes are created by taking the codes as they appear in FIG. 3 and combining them with the encryption key ID. Again, the particular encryption method is not material to the present invention, besides the fact that the encrypted Label Codes must be able to be decrypted using the encryption key ID (i.e., the encryption method cannot be a "one way" process like the typical public/private key method). The travel system inserts these encrypted codes into the Label Code fields of the various option statements (608) and gathers the other HTML codes necessary to generate a web page on the customer's computer (610).

After a web page has been formed with the encryption key ID and the encrypted Label Codes, the travel system sends the HTML codes describing the web page to the customer who requested it (612). The browser on the customer's computer then displays a web page. Importantly, the encryption key ID and the scrambled Label Codes are not visible to the customer, and the web page can appear as shown in FIG. 2.

The customer then selects from the various options presented in the web page (614). With reference to FIG. 2, the customer would select a departure and arrival city (and a return city if applicable), as well as the corresponding dates and times from boxes 202, 206, 208, 210, 212, 214, and 216.

After selecting the desired cities and times, the customer selects button 236 to transmit the flight information that describes the customer's selections to the travel system (616). For box 202, this information would be in the format as shown in FIG. 5. This information includes the encryption key ID and the encrypted Label Codes that correspond to the Displayed Name Labels selected by the customer. These encrypted Label Codes are unique to the particular web page that was previously sent to the customer's computer from the travel system. Thus, the data snooper cannot extract any meaningful information from these codes and cannot use the codes to initiate a search for alternative service providers.

Upon receiving the flight information sent to it by the customer, the travel system first determines whether the information it just received should be encrypted (617). In some embodiments, the travel system can accept both encrypted or unencrypted Label Codes. If the travel system can accept both types of Codes, a data snooper could send unencrypted Codes to the travel system and the travel system might accept such Codes. To prevent this from happening, the travel system creates a list of the encrypted Label Codes that are sent to the customer's computer. Upon receiving a Label Code back from the customer's computer, the travel system compares the received Code to the Codes in the list. If the Label Code received from the customer's computer appears in the list of encrypted Codes but is not encrypted, the travel system will reject the Code.

Next, using the encryption key ID, the travel system decrypts the Label Codes, thereby determining the actual departure and destination information specified by the customer (618). The method for decrypting the Label codes is similar to the method used to encrypt them, except the process is reversed. As part of the decryption process, the time stamp that makes up part of the encryption key ID is also extracted and checked to ensure that the encryption key ID was generated within a predetermined time period. If the flight information submitted by the customer contains an encryption key ID that was generated outside this predefined time period, a new encryption key ID is generated and the customer is asked to resubmit the flight information. Once the departure and destination information has been determined, this information is passed to other routines in the travel system to retrieve the various flight and fare combinations that meet the customer's requirements specified in the flight information (hereinafter referred to as "responsive flight information") (620).

Web sites employing the technique described in FIG. 6 can prevent data snoopers from determining the flight information previously specified by a customer by looking at only the information submitted by the customer to the travel web site. Also, the technique described in FIG. 6 prevents flight data snoopers from submitting queries directly to the subject web site because an encryption key ID cannot be unilaterally created by the flight data snooper. Without an encryption key ID generated by the travel system, Label Codes sent to the travel system cannot be decrypted and will not be processed.

In addition, non-encrypted Label Codes can be used in combination with encrypted Label Codes. In such systems, the encrypted Label Codes can have certain values prepended to them in order to alert the system that such Codes are encrypted and need to be decrypted before they can be used.

The example presented above discusses implementing the present invention in conjunction with HTML option statements. The present invention, however, can also be implemented in other HTML statements. For example, the SELECT tag's NAME attribute and the INPUT tag's NAME and VALUE attributes can be encrypted in the same manner as Label Codes. Specifically, like Label Codes, these attributes can be assigned an encrypted value. When these attributes are then returned to the travel system, they can be decoded as the Label Codes are. Operating in this manner allows the attributes to be assigned encrypted values that vary from one web page to another and which do not directly convey information to a data snooper.

In the case of option statements, data snoopers can overcome the obstacles mentioned above by directly analyzing the HTML codes that comprise the web page itself. As shown in FIG. 3, option statements contain the mappings between the scrambled Label Codes and the Displayed Name Labels. Data snoopers can analyze these option statements themselves to determine the association between the scrambled Label Codes and the Displayed Name Labels. Since the Displayed Name Labels must be descriptive of the information they represent (i.e., they cannot be scrambled since they must convey information directly to a customer), data snoopers can determine the flight information entered by a customer by first obtaining the Label Codes from the information transmitted to the web site. Then, by using the knowledge gained by examining the option statements, determining the Displayed Name Labels associated with the scrambled Label Codes.

The flowchart shown in FIG. 7 describes the process by which a data snooper can extract flight information from a travel system that uses the method described in FIG. 6. The flowchart in FIG. 6 begins after the HTML codes containing the scrambled Label Codes have been transmitted to a customer's computer. After the codes are received by the customer's computer, the data snooper reviews the HTML codes looking for option statements that describe which scrambled Label Codes are associated with which Displayed Name Labels (702). Much as the travel system did in the method shown in FIG. 6, the data snooper builds a table or other structure which describes which Label Codes are associated with which Displayed Name Labels (704). The data snooper then waits for the customer to submit flight information to the travel system (706). When the customer submits this information, the data snooper captures the information and extracts the Label Codes being transmitted to the travel system (708). Since these codes are scrambled, they cannot be used directly. Instead, the flight data snooper uses these codes to index into the structure it previously built containing the association between the Displayed Name Labels and the Label Codes (710). Once it determines the Displayed Name Labels associated with the Label Codes transmitted by the customer to the travel system, the data snooper can then determine the flight information specified by the customer and can conduct searches for comparable flights as is currently done.

An additional technique the travel system can use to prevent a data snooper from obtaining responsive flight information involves the use of graphics files. Currently, once a customer submits flight information to the travel system, the travel system returns information to the customer about flights that are available at the times selected by the customer, as well as the fares associated with these flights. Normally, this responsive flight information is sent to the customer's computer in a text format. Screen 800, shown in FIG. 8, is an example of a screen presenting such information. The HTML code required to generate screen 800 is the same code normally used to present the ASCII text and other input options shown in screen 800. Since this responsive flight information is found in the HTML codes as ASCII formatted text, data snoopers can easily read the HTML codes that contain responsive flight information and extract the information they wish to use.

Instead of using ASCII text to display the responsive flight information, the travel system can send the same information to the customer's computer in the form of a gif file. Normally, gif files are used to present a graphic image on the customer's computer. Gif files, like most graphics files, define images in a manner other than by use of ASCII text. Thus, data snoopers cannot directly read such textual information from the file, and therefore cannot gather responsive flight information from the travel system.

FIG. 9 is a flowchart that describes how a travel system uses a gif file to present responsive flight information. Initially, flight information is received from a customer's computer (902). Upon receiving this flight information, the travel system searches for flights that meet the requirements specified in the flight information (904). Once the travel system determines which, if any, flights meet the specifications contained in the flight information, the travel system formats the responsive flight information, then converts the formatted flight information into a gif file (906). The gif file, along with the HTML codes necessary to display the gif file, is then transmitted to the customer's computer (908). The screen, as described in the HTML codes and the gif file, is then displayed on the customer's computer (910). FIG. 10 shows some of the HTML codes necessary to create the screen shown in FIG. 8 using a gif file.

FIG. 11 is a flowchart that presents yet another method of preventing a data snooper program from intercepting data. Oftentimes, a data snooper monitors the web pages requested by a customer's browser program. This monitoring process consists of comparing URLs requested by the customer's browser to a fixed list of URLs that are associated with known travel reservation web pages. When the data snooper sees that the web page requested by the customer's browser matches a web page of interest (e.g., a web page that begins a travel reservation process), the data snooper knows to begin analyzing the data and customer's selections on the requested page. This mode of operation is possible because, in most embodiments, the URL identifying the reservation page is static.

A way to foil this method of operation is to replace this static URL with ones that change over time. In this mode of operation, the travel system generates a set of random URLs (1102). These "alias names" are substitutes for the URL that would normally be associated with the web page that begins the reservation process. Next, the travel system internally associates these alias names with the URL of the real page that begins the reservation process (1104). After associating the alias names with the URL of the actual reservation page, the invention described in FIG. 10 periodically substitutes in one of these alias names in place of the reservation page URL (1106). This method of operation prevents data snoopers from keying on any particular URL. When a customer selects one of these alias names, the customer's browser requests the web page located at the address specified by this alias name. Upon receiving such a request, the travel system analyzes the alias name and determines the location of the actual page associated with this name (1108). Then, the page is sent to the user to begin the reservation process (1110).

As indicated above, aspects of this invention pertain to specific "method functions" that can be implemented through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g., read only memory devices within a computer such as ROMs or CD-ROM disks readable only by a computer I/O attachment); (b) information alterably stored on writeable storage media (e.g., floppy disks and hard drives); or (c) information conveyed to a computer through communication media, such as a local area network (LAN), a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

The invention claimed is:

1. A computer-implemented method for overcoming a security scheme for a web page, comprising:
   intercepting a first data transmission, received from a first web server over a network, the first data transmission including first page data defining the web page and including:
      a set of human-readable labels, each label adapted for presentation to the user on the web page and associated with an option from a set of options for selection by the user; and
      a first set of codes, each code in the first set of codes associated with a label in the set of labels and adapted to be sent in transmissions identifying a selection by the user of the option associated with the corresponding code, wherein each code in the first set of codes has an arbitrary value configured to mask the association between the code and the option associated with the code;
   intercepting a second data transmission including second page data defining the web page and including:
      the set of human-readable labels; and
      a second set of codes, each code in the second set of codes associated with a label in the set of labels and adapted to be sent in transmissions identifying a selection by the user of the option associated with the corresponding code, wherein each code in the second set of codes has an arbitrary value configured to mask the association between the code and the option associated with the code,
      wherein a first code in the first set of codes is associated with a first option in the set of options and a second code in the second set of codes is associated with the first option and the value of the first code is different from the value of the second code;
   identifying correlations between options in the set of options and codes in the first set of codes associated with the set of labels;
   intercepting a user selection transmission including a particular code in the first set of codes associated with a particular option in the set of options, the user selection transmission sent in response to a selection by the user of the particular option; and
   identifying the particular option associated with the particular code based on the identified correlations.

2. The method of claim 1, further comprising:
   determining that at least one option adapted for use in queries to a second web server corresponds to the particular option determined to be associated with the particular code included in the first transmission;
   transmitting a query to the second web server, the request including the at least one option adapted for use in queries to a second web server.

3. The method of claim 1, wherein the information includes HTML codes that define the web page for option statements that include the codes and the labels.

4. The method of claim 1, wherein the user selection transmission is sent to the first web server.

5. The method of claim 1, further comprising:
   identifying which particular web site is being accessed by the user in connection with the selection by the user of the particular option on the web page;
   using the identification of the particular web site to identify a context for the particular option.

6. The method of claim 2, further comprising:
   receiving result data from the second web server in response to the query, the result data generated based at least in part on the option adapted for use in queries to a second web server; and
   presenting the result data to the user, wherein the information is flight information and the responsive information is responsive flight information.

7. A non-transitory computer-readable storage device storing instructions for causing data processing apparatus to perform certain operations to overcoming a security scheme for a web page, the operations comprising:
   intercepting a first data transmission, received from a first web server over a network, the first data transmission including first page data defining the web page and including:
      a set of human-readable labels, each label adapted for presentation to the user on the web page and associated with an option from a set of options for selection by the user; and
      a first set of codes, each code in the first set of codes associated with a label in the set of labels and adapted to be sent in transmissions identifying a selection by the user of the option associated with the corresponding code, wherein each code in the first set of codes has an arbitrary value configured to mask the association between the code and the option associated with the code;
   intercepting a second data transmission including second page data defining the web page and including:
      the set of human-readable labels; and
      a second set of codes, each code in the second set of codes associated with a label in the set of labels and adapted to be sent in transmissions identifying a selection by the user of the option associated with the corresponding code, wherein each code in the second set of codes has an arbitrary value configured to mask the association between the code and the option associated with the code,
      wherein a first code in the first set of codes is associated with a first option in the set of options and a second code in the second set of codes is associated with the first option and the value of the first code is different from the value of the second code;
   identifying correlations between options in the set of options and codes in the first set of codes associated with the set of labels;
   intercepting a user selection transmission including a particular code in the first set of codes associated with a particular option in the set of options, the user selection transmission sent in response to a selection by the user of the particular option; and
   identifying the particular option associated with the particular code based on the identified correlations.

8. The computer-readable medium of claim 7, the operations further comprising:
   determine that at least one option adapted for use in queries to a second web server corresponds to the particular option determined to be associated with the particular code included in the first transmission; and
   transmit a query to the second web server, the request including the at least one option adapted for use in queries to a second web server.

9. The computer-readable medium of claim 7, wherein the information includes HTML codes that define the web page for option statements that include the codes and the labels.

10. The computer-readable medium of claim 7, wherein the user selection transmission is sent to the first web server.

11. The computer-readable medium of claim 7, the operations further comprising:
   identify which particular web site is being accessed by the user in connection with the selection by the user of the particular option on the web page;
   use the identification of the particular web site to identify a context for the particular option.

12. The computer-readable medium of claim 8, the operations further comprising:
   receiving result data from the second web server in response to the query, the result data generated based at least in part on the option adapted for use in queries to a second web server; and
   presenting the result data to the user, wherein the information is flight information and the responsive information is responsive flight information.

13. The method of claim 2, wherein the at least one option adapted for use in queries to the second web server is substantially equivalent to the particular option.

14. The method of claim 6, wherein
   the first web page is adapted to return first travel itinerary data to the user in response to a selection by the user of one of the set of options, wherein the set of options are travel criteria options;
   the at least one option adapted for use in queries to the second web server is a travel criteria option; and
   the second web server is adapted to return second travel itinerary data to the user in response to the query.

15. The method of claim 1, wherein intercepting transmissions including page data that define the web page, identifying correlations between options and codes, intercepting a user selection, and identifying the particular option associated with the particular code are performed by a processor executing a data snooper application.

16. The method of claim 1, wherein the arbitrary value of each code in the first set of codes and second set of codes is an encrypted value.

17. The method of claim 16, wherein the arbitrary value of each corresponding code in the first set of codes is generated through an encryption process utilizing a first encryption key identification code and the arbitrary value of each corresponding code in the second set of codes is generated through an encryption process utilizing a second encryption key identification code different from the first encryption key identification code.

18. The method of claim 17, wherein the first data transmission further includes the first encryption key identification code and the second data transmission further includes the second encryption key identification code.

19. The method of claim 17, wherein the user selection transmission includes the first encryption key identification code.

20. The method of claim 1, wherein the arbitrary value of each code in the first set of codes and second set of codes is further configured to prevent a program external to a browser rendering the webpage from using data transmitted from the first web server.

\* \* \* \* \*